US009207130B2

(12) United States Patent
Mori

(10) Patent No.: US 9,207,130 B2
(45) Date of Patent: Dec. 8, 2015

(54) SENSOR AND METHOD FOR MANUFACTURING THE SAME

(75) Inventor: Akio Mori, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 501 days.

(21) Appl. No.: 13/605,910

(22) Filed: Sep. 6, 2012

(65) Prior Publication Data

US 2013/0064266 A1 Mar. 14, 2013

(30) Foreign Application Priority Data

Sep. 7, 2011 (JP) .................................. 2011-194870
Aug. 28, 2012 (JP) .................................. 2012-187296

(51) Int. Cl.
| | | |
|---|---|---|
| G01K 7/00 | (2006.01) |
| G01K 1/00 | (2006.01) |
| G01K 1/14 | (2006.01) |
| G01K 13/04 | (2006.01) |
| G01K 13/02 | (2006.01) |

(52) U.S. Cl.
CPC ............. *G01K 13/02* (2013.01); *F01N 2560/06* (2013.01); *G01K 2205/04* (2013.01); *Y10T 29/49117* (2015.01)

(58) Field of Classification Search
CPC ........... G01K 7/00; G01K 1/14; G01K 13/00; G01K 1/00
USPC ..................................... 374/183, 179; 29/825
See application file for complete search history.

(56) References Cited

U.S. PATENT DOCUMENTS

| 2,581,229 | A | * | 1/1952 | Battey ........................... 136/233 |
| 4,087,775 | A | * | 5/1978 | MacKenzie et al. ............. 338/28 |
| 4,091,259 | A | * | 5/1978 | Tanaka et al. ............. 219/137 R |
| 5,119,538 | A | * | 6/1992 | White et al. ..................... 29/612 |
| 5,221,815 | A | * | 6/1993 | Bostock et al. .............. 174/84 R |
| 5,296,456 | A | * | 3/1994 | Shiga et al. .................... 505/230 |
| 5,598,922 | A | * | 2/1997 | Good ............................. 206/299 |
| 6,698,922 | B2 | * | 3/2004 | Adachi et al. ................. 374/208 |
| 7,553,078 | B2 | * | 6/2009 | Hanzawa et al. ............. 374/185 |
| 7,834,268 | B2 | * | 11/2010 | Ootsuki ........................ 174/74 R |
| 8,523,432 | B2 | * | 9/2013 | Mujumdar et al. ........... 374/208 |
| 8,864,375 | B2 | * | 10/2014 | Abe et al. ........................ 374/163 |
| 2002/0135454 | A1 | * | 9/2002 | Ichida et al. .................... 338/25 |
| 2003/0173635 | A1 | * | 9/2003 | Akram et al. ................. 257/467 |

(Continued)

FOREIGN PATENT DOCUMENTS

| DE | 102010039098 | * 2/2012 |
| JP | 57-24726 U | 2/1982 |

(Continued)

OTHER PUBLICATIONS

Communication dated Feb. 13, 2015 from the Japanese Patent Office in counterpart application No. 2012-187296.
Communication dated Jun. 17, 2015 from the Japanese Patent Office issued in corresponding Japanese application No. 2012-187296.

*Primary Examiner* — Gail Kaplan Verbitsky
(74) *Attorney, Agent, or Firm* — Sughrue Mion, PLLC

(57) ABSTRACT

A sensor and method of manufacturing the same. A plurality of conductors (33) constituting an electricity conduction wire (37) are fused and joined for unification by a first resistance welding operation. Subsequently, a terminal wire (20) and the electricity conduction wire (37) are caused to overlap in the axial direction and connected by a second resistance welding operation.

8 Claims, 16 Drawing Sheets

(56) References Cited

U.S. PATENT DOCUMENTS

| | | | |
|---|---|---|---|
| 2009/0218134 A1* | 9/2009 | Stroh et al. | 174/74 R |
| 2009/0323765 A1* | 12/2009 | Yokoi et al. | 374/185 |
| 2010/0091817 A1* | 4/2010 | Wienand et al. | 374/185 |
| 2011/0155415 A1* | 6/2011 | Steinich | 174/93 |
| 2011/0228812 A1* | 9/2011 | Suzuki et al. | 374/163 |
| 2012/0039362 A1* | 2/2012 | Pedersen et al. | 374/208 |
| 2012/0298645 A1* | 11/2012 | Kleespiess et al. | 219/137 R |
| 2013/0140082 A1* | 6/2013 | Willing et al. | 174/84 C |

FOREIGN PATENT DOCUMENTS

| | | |
|---|---|---|
| JP | 62-265702 A | 11/1987 |
| JP | 5-300688 A | 11/1993 |
| JP | 7-140012 A | 6/1995 |
| JP | 2004266058 A * | 9/2004 |

* cited by examiner

SENSOR AND METHOD FOR MANUFACTURING THE SAME

TECHNICAL FIELD

The present invention relates to a sensor in which terminal wires extending from, for example, a temperature sensing portion of a temperature sensing element are joined through welding to electricity conduction wires (e.g., lead wires) each composed of a plurality of conductors, and to a method of manufacturing the same. More particularly, the present invention relates to a sensor which can be suitably used in a condition in which vibration acts on the main body thereof, the peripheries of lead wires, etc., such as a vehicular temperature sensor or a sensor for high temperature used for measurement of exhaust gas from a general purpose engine for stationary use, and to a method of manufacturing the same.

BACKGROUND ART

Conventionally, temperature sensors have been used so as to measure the temperatures of exhaust gas, etc. of, for example, an engine, and temperature sensors having various structures have been proposed.

For example, the below listed Patent Document 1 discloses a technique of covering a thermistor element with an insulator and joining a terminal wire extending from the thermistor element with a plurality of conductors projecting from an end of an insulated wire through use of solder.

Also, the below listed Patent Document 2 discloses a wire joining technique for a temperature sensor which includes a thermistor element. According to the technique, each of terminal wires extending from the thermistor element and passed trough an insulator tube is joined, through welding, to a plurality of conductors, which constitute a lead wire, at the rear end side of the interior of the temperature sensor.

PRIOR ART DOCUMENTS

Patent Documents

[Patent Document 1] Japanese Patent Application Laid-Open (kokai) No. H5-300688
[Patent Document 2] Japanese Patent Application Laid-Open (kokai) No. H7-140012

SUMMARY OF THE INVENTION

Problems to be Solved by the Invention

Of the above-described conventional techniques, the technique of joining each terminal wire extending from a thermistor element with a plurality of conductors of a corresponding lead wire through resistance welding has a problem in that control of welding current is not easy.

Specifically, in the case where each lead wire is composed of a plurality of conductors of small diameter, if the welding current is large, the conductors may fuse and break. If the welding current is decreased so as to cope with such a problem, welding is not performed adequately, and the welded portion may separate.

In order to reliably weld a plurality of loose conductors to a single plate-like or bar-like terminal wire, a welding operation must be performed four or five times, which raises a problem of requiring a long time for welding work.

In view of the foregoing problem, an object of the present invention is to provide a sensor and a method of manufacturing the same in which a single terminal wire and a plurality of conductors can be welded easily and reliably for unification.

Means for Solving the Problems (1) The present invention which has been accomplished so as to solve the above-described problem provides, as its first mode (an invention of a method of manufacturing a sensor), a method of manufacturing a sensor comprising a detection element having a detection portion whose electrical characteristic changes with a change in an atmosphere, and a terminal wire extending from the detection portion in an axial direction; and an electricity conduction wire composed of a plurality of stranded conductors, extending in the axial direction, and conveying an electric signal from the detection element, the terminal wire and the electricity conduction wire being disposed such that they overlap each other in the axial direction and being joined through welding. The method is characterized by comprising a first step of partially fusing the plurality of conductors by first welding, to thereby unite the plurality of conductors; and a second step of connecting the terminal wire and the electricity conduction wire by forming a second weld portion by second welding in a region where the terminal wire overlaps with the electricity conduction wire.

In the present mode, the plurality of conductors, which constitute the electricity conduction wire, are fused and joined together for unification by the first welding. Subsequently, the electricity conduction wire, which is formed of the plurality of stranded (united) conductors, and the terminal wire are connected by forming the second weld portion by the second welding in a region where the electricity conduction wire and the terminal wire overlap with each other in the axial direction. Therefore, as compared with a conventional technique, the terminal wire and the electricity conduction wire can be connected easily and reliably for unification.

Namely, in the present mode, the terminal wire is welded, through the second welding, to the electricity conduction wire, which is formed by uniting the plurality of thin conductors by the first welding and which is substantially thicker (than the conductors). Therefore, welding current in the second welding can be set properly. Namely, a welding current suitable for a thick electricity conduction wire (composed of the plurality of conductors) can be set. Thus, it is possible to prevent the conductors from fusing and breaking at the time of welding (due to an excessively large welding current), and prevent the welded portion from separating (due to an excessively small welding current).

Also, it is unnecessary to repeatedly perform welding for loosed conductors as in the conventional method, and welding is only required to be preformed a necessary minimum number of times (e.g., one time) for the thick electricity conduction wire. Therefore, working efficiency is high.

(2) A second mode of the present invention is characterized in that the first welding joins and unites the plurality of conductors at their forward ends.

In the present mode, since the plurality of conductors are fused and joined at their forward ends for unification by the first welding, the conductors are unlikely to become loose (in the electricity conduction wire formed by joining the conductors). Also, when the terminal wire is welded to the electricity conduction wire by the second welding, the terminal wire can be welded to the electricity conduction wire at any position located rearward of the weld portion at the forward end of the electricity conduction wire. Therefore, the region in which welding can be performed is wide, and welding work is easy.

Notably, the "forward ends of the conductors" refer to their ends corresponding to the forward end of the electricity conduction wire in the longitudinal direction (in the axial direction), and the "rear ends of the conductors" refer to the ends opposite the forward ends of the conductors (this also applies to the following description). Accordingly, in the electricity conduction wire, a portion where the conductors are covered with an insulation layer is a rear end portion of the electricity conduction wire, and a portion where the conductors are not covered by the insulation layer and are exposed is a front end portion of the electricity conduction wire.

(3) A third mode of the present invention is characterized in that the first welding joins and unites the plurality of conductors at a position located rearward of forward ends of the conductors.

In the present mode, since the plurality of conductors are welded and joined together for unification by the first welding at a position located rearward of the forward ends of the conductors, the region in which the first welding can be performed is wide, and the work for performing the first welding is easy.

(4) A fourth mode of the present invention is characterized in that a first weld portion which unites the conductors is formed by the first welding, and the second weld portion is formed by the second welding such that the second weld portion at least partially overlaps with the first weld portion.

In the present mode, welding may be performed in such a manner that the first weld portion at least partially overlaps with the second weld portion. In this case, since it is unnecessary to perform the second welding while avoiding the first weld portion, the terminal wire and the electricity conduction wire can be joined easily.

Notably, the position of the second weld portion may be located on the forward end side or rear end side (of the electricity conduction wire) in relation to the first weld portion.

(5) A fifth mode of the present invention is characterized in that a first weld portion which unites the conductors is formed by the first welding, and the second weld portion is formed by the second welding at a position located rearward of the first weld portion.

In the present mode, the first weld portion and the second weld portion are separated from each other. Therefore, the present mode has a merit; i.e., when the second welding is performed, it is not affected by the first weld portion (for example, the current for the second welding is prevented from flowing mainly through the first weld portion at the time of resistance welding), and the second welding can be performed reliably.

(6) The present invention provides, as a sixth mode (an invention of a sensor), a sensor comprising a detection element having a detection portion whose electrical characteristic changes with a change in an atmosphere, and a terminal wire extending from the detection portion in an axial direction; and an electricity conduction wire composed of a plurality of stranded conductors, extending in the axial direction, and conveying an electric signal from the detection element, the detection element and the electricity conduction wire being disposed such that they overlap each other in the axial direction and being joined through welding. The sensor is characterized in that the plurality of conductors has a first weld portion where they are united by welding; and the terminal wire and the electricity conduction wire are connected by a second weld portion formed in a region where the terminal wire overlaps with the electricity conduction wire.

Namely, in the sensor of the present mode, the plurality of the conductors are united by the first weld portion. Therefore, it is unnecessary to repeatedly perform welding for loosed conductors so as to form the second weld portion, and welding is only required to be preformed a necessary minimum number of times (e.g., one time) for a single thick electricity conduction wire. Therefore, working efficiency is high.

(7) A seventh mode of the present invention (an invention of a sensor) is characterized in that the first weld portion is formed in the region where the terminal wire overlaps with the electricity conduction wire.

Even in the case where the first weld portion is formed on the plurality of stranded conductors so as to unite them, the risk that the conductors loose increases with the distance from the first weld portion. Therefore, if the second weld portion is formed at a position remote from the first weld portion, there arises a possibility that the terminal wire is not joined to the electricity conduction wire to a sufficient degree. In contrast, in the sensor of the present mode, since both the first weld portion and the second weld portion are formed in the region where the terminal wire overlaps with the electricity conduction wire, the risk that the conductors loose is low, and the terminal wire and the electricity conduction wire can be joined to a sufficient degree.

(8) An eighth mode of the present invention (an invention of a sensor) is characterized in that the detection element has a pair of the terminal wires; and the plurality of conductors have, at their forward ends, the first weld portion where they are united by welding.

In the case of a sensor in which the distance between a pair of terminal wires is small, if the forward end of the electricity conduction wire is loose, the conductors of adjacent electricity conduction wires may contact and form a short circuit. In contrast, in the sensor of the present mode, since the forward ends of the plurality of conductors are united through formation of the first weld portion, the forward end of the electricity conduction wire does not loose, and there is no possibility that the conductors of adjacent electricity conduction wires contact and form a short circuit.

(9) A ninth mode of the present invention (an invention of a sensor) is characterized in that the second weld portion is formed at a position located rearward of the first weld portion through welding between the terminal wire and the electricity conduction wire.

In the sensor of the present mode, since the second weld portion is formed at a position located rearward of the first weld portion where the plurality of conductors are united through welding, the terminal wire and the electricity conduction wire are connected reliably.

BRIEF DESCRIPTION OF THE DRAWINGS

FIG. 1 is a sectional view of a temperature sensor of a first embodiment, taken along the axial direction thereof.

FIG. 2 is a sectional view of a lead wire of the temperature sensor of the first embodiment, taken perpendicular to the axial direction.

FIG. 3 is an enlarged sectional view of the temperature sensor of the first embodiment, taken along the axial direction and showing the joint portions between lead wires and relay wires.

FIG. 4 is a sectional view of an internal forward end portion and an internal rear end portion, taken along the axial direction, of the temperature sensor of the first embodiment in a state before being united in a method of manufacturing the temperature sensor.

[FIG. 5]

[FIG. 6]

FIG. 7 is a sectional view of various members taken along the axial direction in a state in which a metallic pipe is brazed to a mounting shell.

FIG. 8 is a sectional view of various members taken along the axial direction in a state in which the internal structure is accommodated in the metallic pipe.

[FIG. 9] FIG. 9 is a set of explanatory views showing a temperature sensor manufacturing method of a second embodiment, wherein

[FIG. 10] FIG. 10 is a set of explanatory views showing a temperature sensor manufacturing method of a third embodiment, wherein

[FIG. ] FIG. 11 is a pair of explanatory views showing a temperature sensor manufacturing method of a fourth embodiment, wherein

[FIG. 12] FIG. 12 is a pair of explanatory views showing a temperature sensor manufacturing method of a fifth embodiment, wherein

MODES FOR CARRYING OUT THE INVENTION

Figure 1:
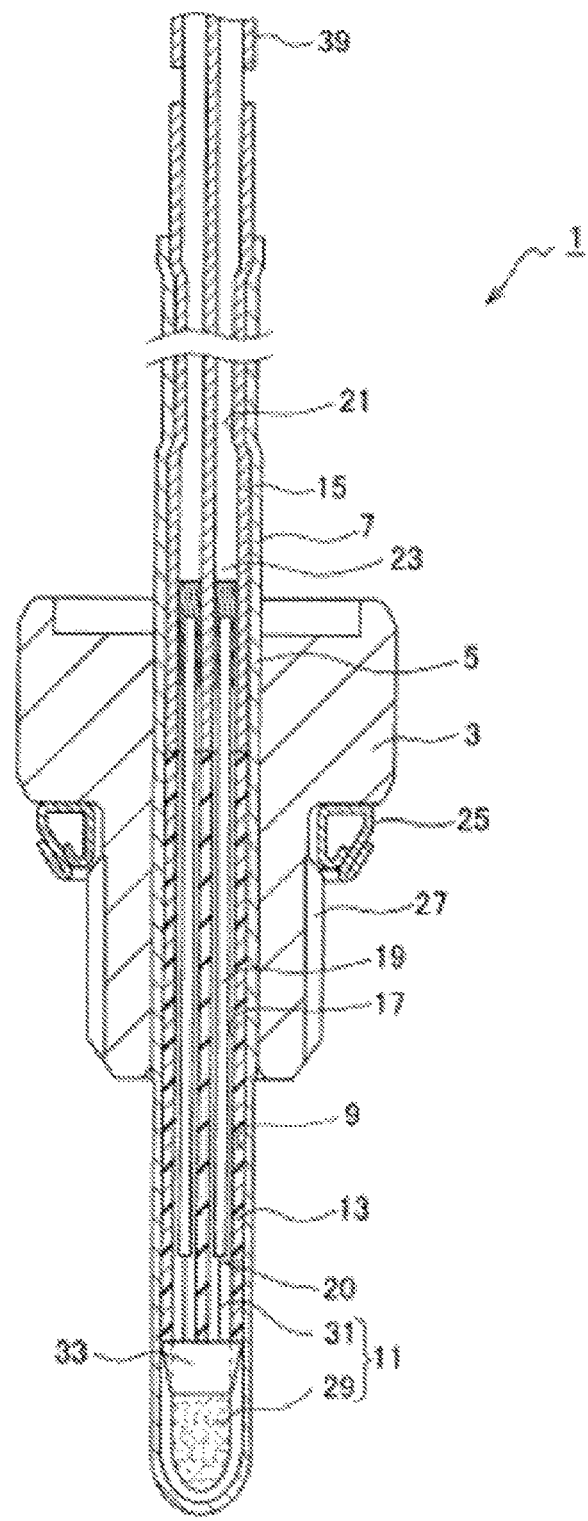
[FIG. 1]

Embodiments of a sensor and a method of manufacturing the same to which the present invention is applied will now be described with reference to the drawings.
[First Embodiment]
Here, description will be made by exemplifying, as the sensor, a temperature sensor which is attached to the exhaust manifold of an engine of an automobile so as to measure the temperature of exhaust gas.
a) First, the structure of the temperature sensor of the present embodiment will be described.
As shown in FIG. 1, the temperature sensor 1 of the present embodiment includes a mounting shell 3 for attaching the temperature sensor 1 to the exhaust manifold (not shown); a metallic pipe 7 inserted through a center hole 5 formed at the center of the mounting shell 3; a temperature sensor element 11 disposed on the forward end side (the lower side in FIG. 1) of an internal hole 9 of the metallic pipe 7; an insulation tube 13 disposed on the rear end side (the upper side in FIG. 1) of the temperature sensor element 11; an auxiliary tube 15 disposed on the rear end side of the insulation tube 13; a pair of relay wires 19 disposed in a pair of through-holes 17 of the insulation tube 13; and a pair of lead wires 23 disposed in a pair of through-holes 21 of the auxiliary ring 15. These components will be described below.

The above-mentioned mounting shell 3 is a fastening nut formed of, for example, S10C, and has the center hole 5 formed at the center thereof. An annular gasket 25 formed of, for example, copper is disposed externally of a center portion of the mounting shell 3. A screw portion 27 for fixing the mounting shell 3 to the exhaust manifold is provided on the outer circumferential surface of a portion of the mounting shell 3 located forward of the gasket 25.

The above-mentioned metallic pipe 7 is an elongated, cylindrical tubular member with a bottom, which is formed of, for example, SUS304L and which has a size of, e.g., 4.1 mm (outer diameter)×3.5 mm (inner diameter)×40 mm (length). The metallic pipe 7 is press-fitted into the center hole 5 of the mounting shell 3, whereby the metallic pipe 7 is fixed to the mounting shell 3. The forward end of the metallic pipe 7 is closed and has a hemispherical shape. A forward end portion of the metallic pipe 7 projects from the forward end of the mounting shell 3, and a rear end portion of the metallic pipe 7 projects from the rear end of the mounting shell 3.

The above-mentioned temperature sensor element 11 is composed of a temperature-sensing portion 29, which is a thermistor sintered body, and a pair of electrode wires (Dumet wires) 31 projecting from the temperature-sensing portion 29 and formed from, for example, Ni wire. A rear end portion of the temperature-sensing portion 29 is joined and fixed to a forward end portion of the insulation tube 13 by cement 33.

The above-mentioned insulation tube 13 is an electrically insulative member formed of, for example, KP-85. The insulation tube 13 has the pair of through-hole 17 extending therethrough in the axial direction in order to accommodate the pair of electrode wires 31 of the temperature sensor element 11.

Each of the above-mentioned relay wires 19 is a strip form of, for example, SUS304 (e.g., 23.5 mm (length)×0.65 mm (width)×0.5 mm (thickness)). The relay wires 19 are inserted into the through-holes 17 of the insulation tube 13. Forward end portions of the two relay wires 19 are joined to and united with rear end portions of the two electrode wires 31 of the temperature sensor element 11 by resistance welding. Rear end portions of the two relay wires 19 project from the insulation tube 13. In the present embodiment, the electrode wires 31 and the relay wires 19 (joined and united together) correspond to the terminal wires 20 of the present invention. In an embodiment in which the relay wires 19 are not provided, the electrode wires 31 correspond to the terminal wires 20 of the present invention.

The above-mentioned auxiliary ring 15 is an electrically insulative seal member formed of, for example, silicon rubber. The auxiliary ring 15 has the pair of through-holes 21 extending therethrough in the axial direction so as to accommodate the pair of lead wires 23. A forward end portion of the auxiliary ring 15 butts against the rear end portion of the insulation tube 13, and a rear end portion of the auxiliary ring 15 projects from the metallic pipe 7.

Figure 2:
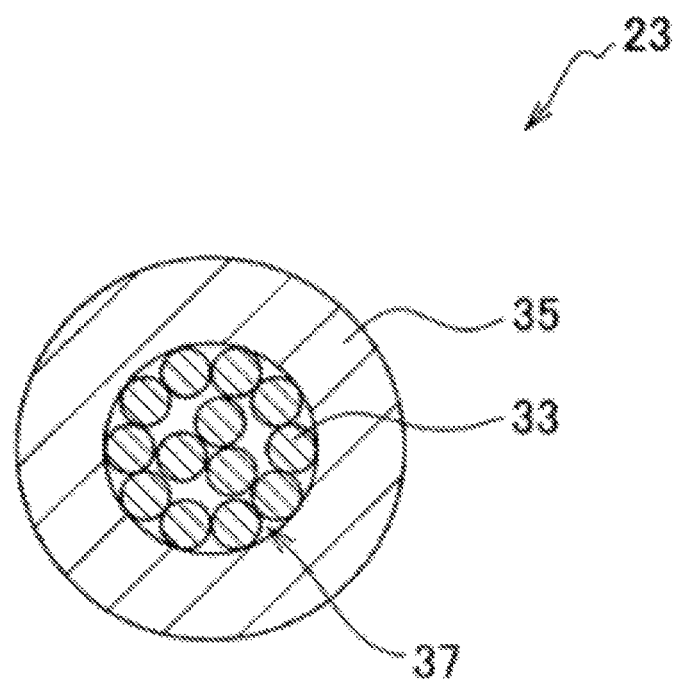
[FIG. 2]

As shown in FIG. 2, each of the above-mentioned lead wires 23 has a structure in which a plurality of thin conductors 33 are bundled (for example, 12 conductors 33 having a diameter of 1.4 mm are stranded), and is covered with an insulating layer 35 formed of, for example, PFA. In the following description, the entire conductor portion formed by the stranded conductors 33 will be referred to as an electricity conduction wire 37.

Also, as shown in FIG. 1, portions of the two lead wires 23 located rearward of the auxiliary ring 15 are accommodated in a protection tube 39 formed of, for example, silicon-varnish-impregnated glass fiber tube.

Figure 3:
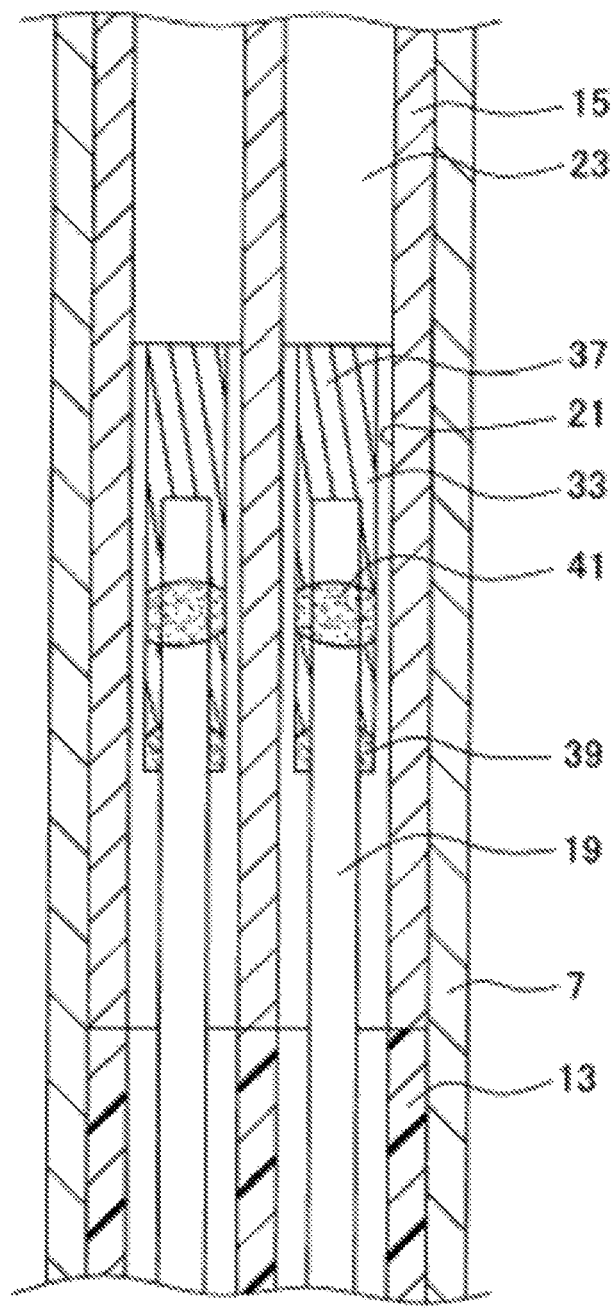
[FIG. 3]

As shown in FIG. 3, which shows a main portion on an enlarged scale, in the present embodiment, forward end portions of the conductors 33 which constitute the electricity conduction wire 37 of each of the two lead wires 23 are fused and joined together for unification, by a first weld portion 39 formed through a first resistance welding operation, within a corresponding one of the two through-holes 21 of the auxiliary ring 15.

The pair of relay wires 19 projecting from the rear end of the insulation tube 13 are connected to the electricity conduction wires 37 of the corresponding lead wires 23, by corresponding second weld portions 41 formed through a second resistance welding operation, within the two through-holes 21 of the auxiliary ring 15.

b) Next, there will be described a method of manufacturing the temperature sensor 1 of the present embodiment.

Figure 4:
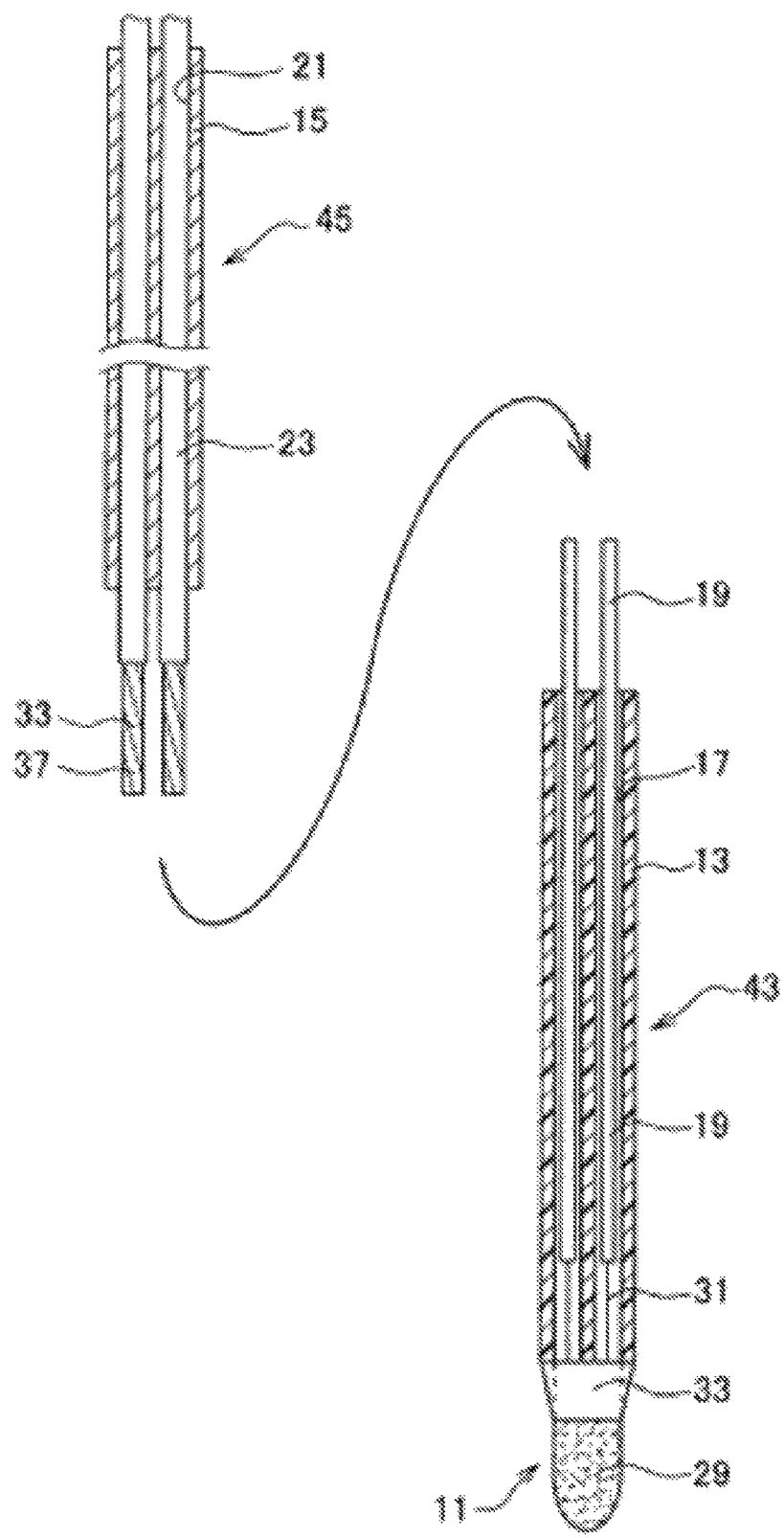
[FIG. 4]
Figure 5A:
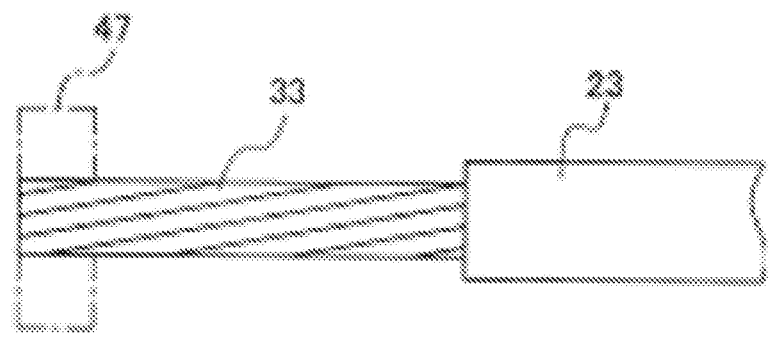
FIG. 5(a) is an explanatory view schematically showing a first resistance welding operation.
Figure 5B:
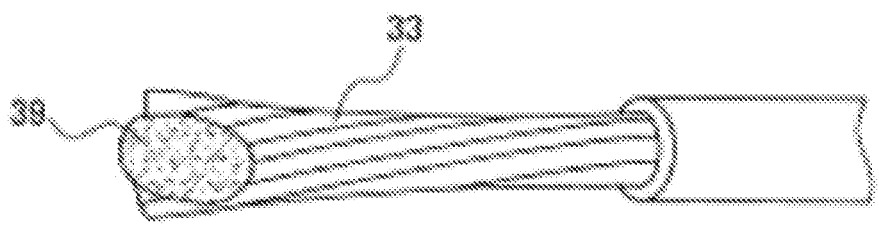
FIG. 5(b) is an explanatory view showing a first weld portion.
Figure 5C:
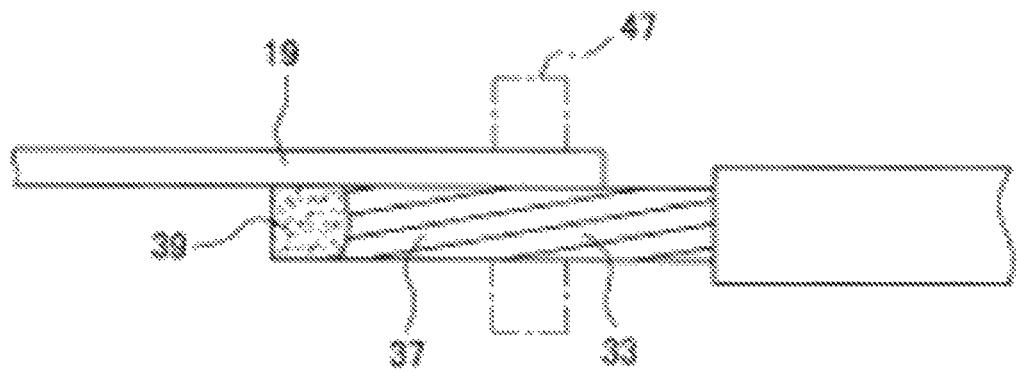
FIG. 5(c) is an explanatory view schematically showing a second resistance welding operation.
Figure 5D:
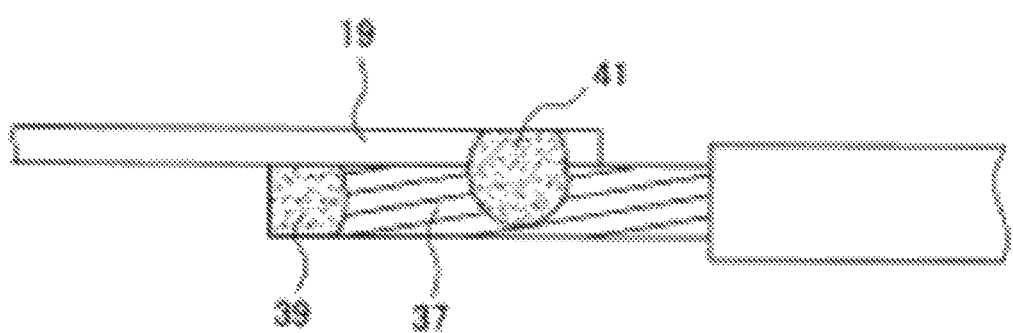
FIG. 5(d) is an explanatory view schematically showing a state after the second resistance welding operation.

As shown in FIG. 4, the structure of a forward end portion of the interior of the temperature sensor 1 (internal forward end portion 43) is first fabricated.

Specifically, the relay wires 19 are joined to the rear end portions of the electrode wires 31 of the temperature sensor element 11 by well known resistance welding.

Next, after the relay wires 19 are passed through the through-holes 17 of the insulation tube 13, an upper portion (the upper side in FIG. 4) of the temperature-sensing portion 29 of the temperature sensor element 11 is joined to the lower end (the lower side in FIG. 4) of the insulation tube 13 by the cement 33.

Meanwhile, the structure of a rear end portion of the interior of the temperature sensor 1 (internal rear end portion 45) is fabricated by passing the lead wires 23 through the through-holes 21 of the auxiliary ring 15.

At that time, for works such as first and second resistance welding operations to be described later, the auxiliary ring 15 is shifted (upward in FIG. 4) such that the lead wires 23 project from the forward end of the auxiliary ring 15.

Next, as shown in FIGS. 5(*a*) and 5(*b*), the conductors 33 are fused and joined together for unification by the first resistance welding operation.

Specifically, as shown in FIG. 5(*a*), a pair of jigs (welding electrodes) 47 used for the first resistance welding operation are disposed to nip the forward ends of the conductors 33 of the lead wire 23, and a current is caused to flow between the welding electrodes 47 so as to generate a Joule heat, to thereby fuse the conductors 33. In this manner, well known resistance welding is performed.

As shown in FIG. 5(*b*), this first resistance welding operation forms the first weld portion 39 which fuses and joins the conductors 33 together for unification.

Next, as shown in FIGS. 5(*c*) and 5(*d*), the electricity conduction wire 37 and the relay wire 19 are connected by the second resistance welding operation.

Specifically, as shown in FIG. 5(*c*), the electricity conduction wire 37 of the lead wire 23 and the relay wire 19 are disposed in an overlapped relation such that their axial directions coincide with each other and the relay wire 19 extends rearward (rightward in FIG. 5) beyond the first weld portion 39. Subsequently, welding electrodes 47 (similar to those used for the first resistance welding operation) used for the second resistance welding operation are disposed to nip the electricity conduction wire 37 and the relay wire 19 at a position on the rear end side of the first weld portion 39, and a current is caused to flow between the welding electrodes 47 so as to generate a Joule heat, to thereby fuse the conductors 33 and the relay wire 19. In this manner, well known resistance welding is performed.

As shown in FIG. 5(*d*), this second resistance welding operation forms the second weld portion 41 which connects the electricity conduction wire 37 and the relay wire 19 in a region where these wires overlap each other.

Figure 6A:
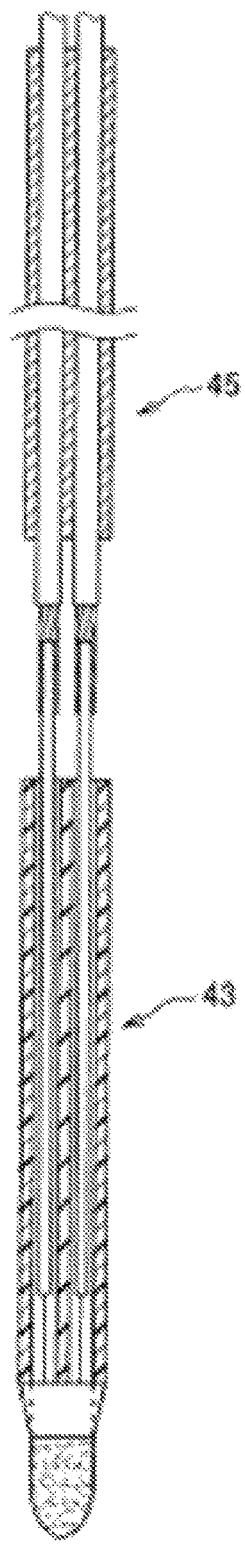
FIG. 6(a) is a sectional view of an internal structure taken along the axial direction, the internal structure being formed by joining the internal forward end portion and the internal rear end portion.
Figure 6B:
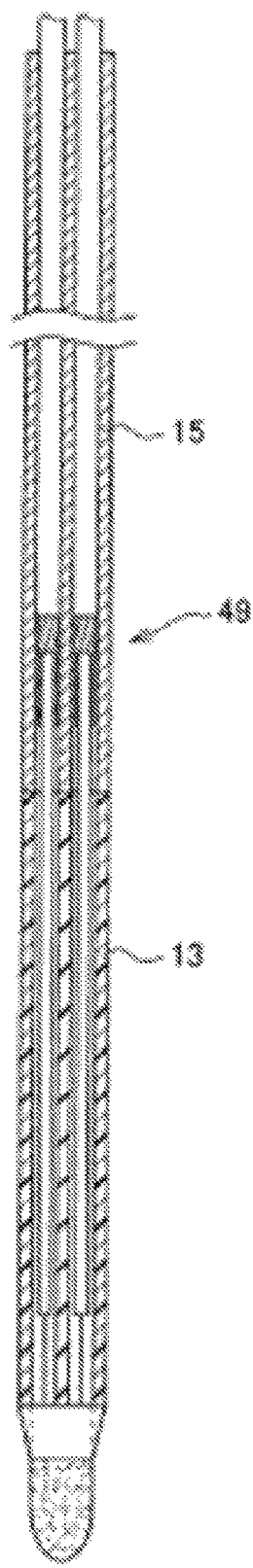
FIG. 6(b) is a sectional view of the internal structure taken along the axial direction in a state in which an auxiliary ring and an insulation tube are butted with each other.

As shown in FIG. 6(*a*), the internal forward end portion 43 and the internal rear end portion 45 are connected by this second resistance welding operation.

Next, as shown in FIG. 6(*b*), the auxiliary ring 15 is moved forward (downward in FIG. 6) so as to cause the auxiliary ring 15 to butt against the rear end surface of the insulation tube 13. Thus, an internal structure 49 within the temperature sensor 1 is completed.

Figure 7:
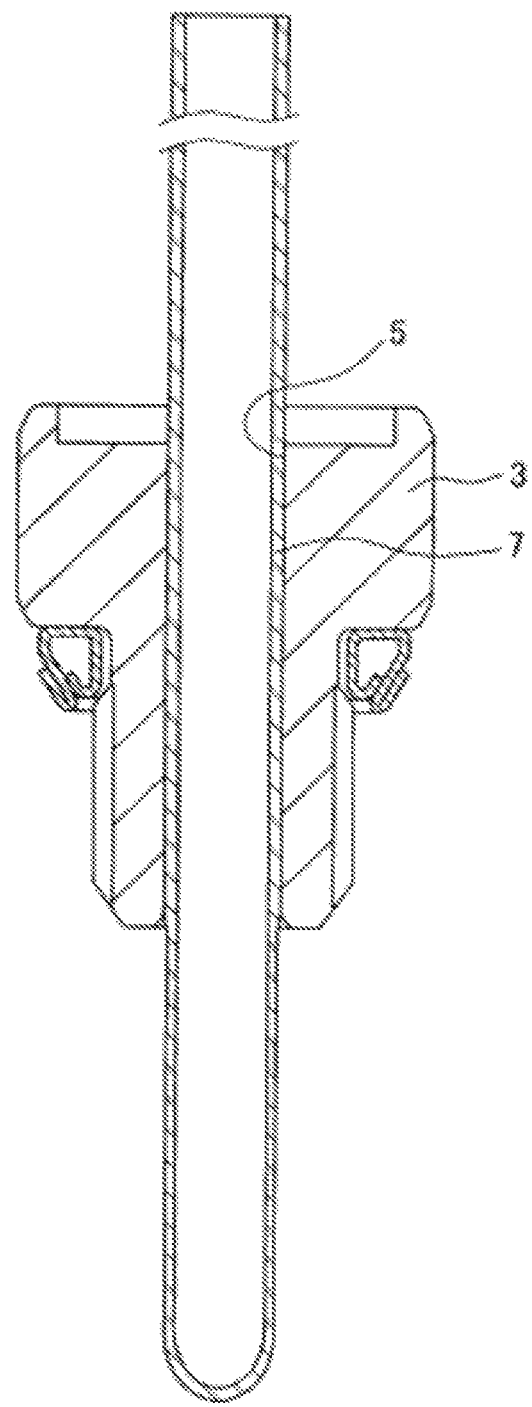
[FIG. 7]

Separately from this, as shown in FIG. 7, the metallic pipe 7 is brazed to the wall surface of the center hole 5 of the mounting shell 3, whereby the metallic pipe 7 is fixed to the mounting shell 3. The method of fixing the metallic pipe 7 is not limited to brazing, and the metallic pipe 7 may be fixed by press-fitting the metallic pipe 7.

Figure 8:
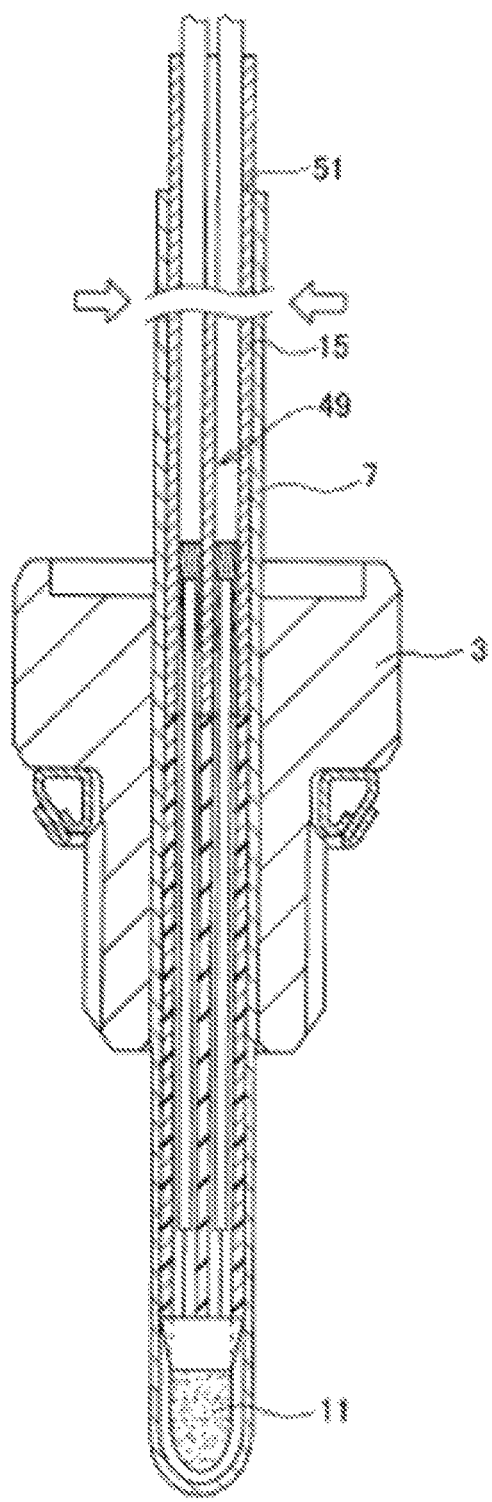
[FIG. 8]

Next, as shown in FIG. 8, the above-described internal structure 49 is inserted into the metallic pipe 7 fixed to the mounting shell 3 through an opening 51 at the rear end (the upper end in FIG. 8) of the metallic pipe 7, in a state in which the internal structure 49 is oriented such that the temperature sensor element 11 is located on the forward end side.

Next, the rear end of the metallic pipe 7 is eternally crimped so as to fix the internal structure 49 (specifically, a portion of the internal structure 49 corresponding to the auxiliary ring 15) to the metallic pipe 7 for unification.

c) The present embodiment provides the following effects by the above-described structure.

In the present embodiment, the plurality of conductors 33, which constitute the electricity conduction wire 37, are fused and joined together for unification by the first resistance welding operation, and the electricity conduction wire 37 composed of the plurality of (united) conductors 33 is then caused to overlap with the terminal wire 20 in the axial direction and is joined thereto by the second resistance welding operation. Therefore, as compared with a conventional method, the electricity conduction wire 37 and the terminal wire 20 can be connected easily and reliably.

Namely, in the present embodiment, through the second resistance welding operation, the terminal wire 20 is welded to the electricity conduction wire 37 which is formed by uniting the plurality of thin conductors 33 by the first resistance welding operation and which is substantially thicker than each conductor 33. Therefore, the welding current in the second resistance welding operation can be set adequately. Namely, a welding current suitable for the thick electricity conduction wire 37 (composed of the plurality of conductors 33) can be set. Thus, it is possible to prevent the conductors 33 from fusing and breaking at the time of welding (due to an excessively large welding current), and prevent the welded portion from separating (due to an excessively small welding current).

Also, it is unnecessary to repeatedly perform welding for loosed conductors as in the conventional method, and welding is only required to be preformed a necessary minimum number of times (e.g., one time) for a single thick electricity conduction wire 37. Therefore, working efficiency is high.

In addition, in the present embodiment, since the plurality of conductors 33 are joined at their ends for unification by the first resistance welding operation, the conductors 33 are unlikely to become loose (in the electricity conduction wire 37 formed by joining the conductors 33). Also, when the terminal wire 20 is welded to the electricity conduction wire 37 by the second resistance welding operation, the terminal wire 20 can be welded to the electricity conduction wire 37 at any position located rearward of the first weld portion 39 at the forward end. Therefore, the region in which welding can be performed is wide, and welding work is easy.

Moreover, in the present embodiment, the first weld portion 39 and the second weld portion 41 are spaced from each other. Therefore, when the second resistance welding operation is performed, it is not affected by the first weld portion 39 (for example, the current for the second welding is prevented from flowing mainly through the first weld portion 39), and the second resistance welding operation can be performed reliably.

[Second Embodiment]

Next, a second embodiment will be described; however, descriptions similar to those provided for the first embodiment will not be provided.

Since the temperature sensor of the present embodiment is identical with that of the first embodiment except for the first and second resistance welding operations, only the first and second resistance welding operations, which are characteristic portions of the present embodiment, will be described.

Figure 9A:
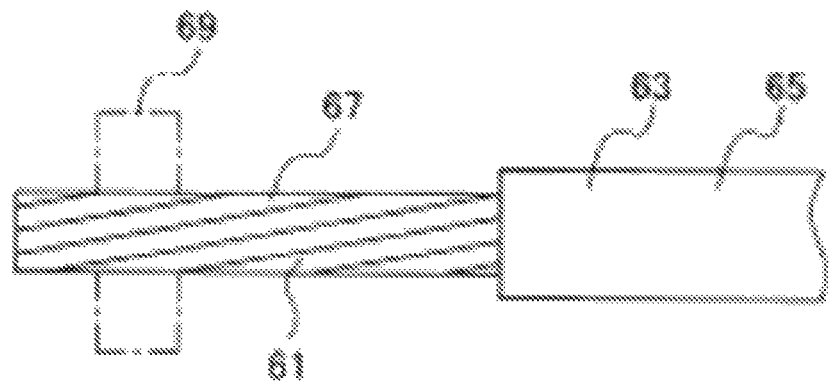
FIG. 9(a) is an explanatory view schematically showing a first resistance welding operation.
Figure 9B:
FIG. 9(b) is an explanatory view showing a first weld portion.

First, as shown in FIGS. 9(a) and 9(b), a plurality of conductors 61 are fused and joined together for unification by the first resistance welding operation.

Specifically, as shown in FIG. 9(a), a pair of welding electrodes 69 used for the first resistance welding operation are disposed to nip a portion of the electricity conduction wire 67 projecting from an insulation layer 65 of a lead wire 63 at a position between the forward end of the projecting portion of the electricity conduction wire 67 and the center thereof (the center in the axial direction). Subsequently, a current is caused to flow between the welding electrodes 69 so as to fuse the conductors 61, whereby well known resistance welding is performed.

As shown in FIG. 9(b), this first resistance welding operation forms a first weld portion 71 which joins the conductors 61 together for unification.

Figure 9C:
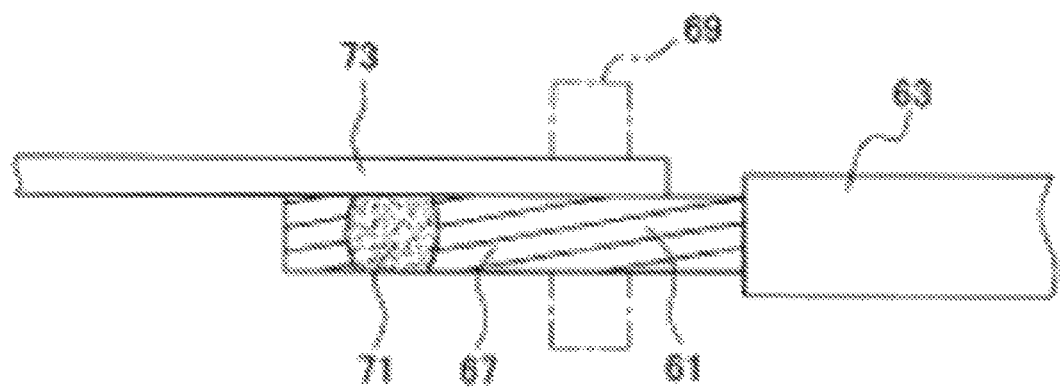
FIG. 9(c) is an explanatory view schematically showing a second resistance welding operation.
Figure 9D:
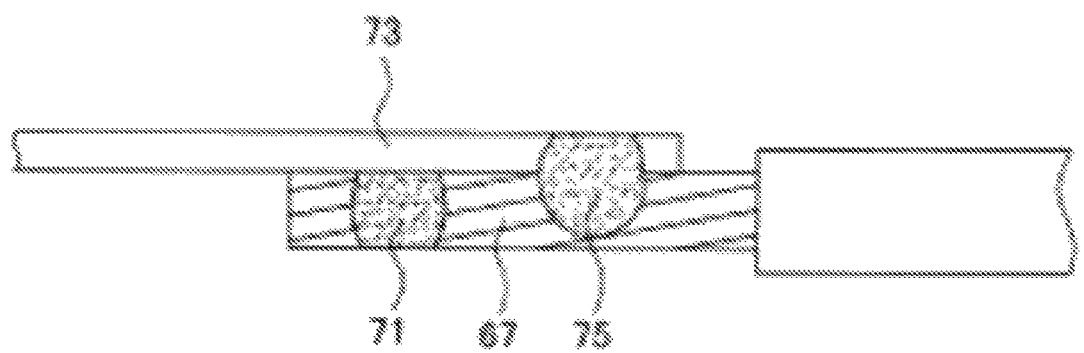
FIG. 9(d) is an explanatory view schematically showing a state after the second resistance welding operation.

Next, as shown in FIGS. 9(c) and 9(d), the electricity conduction wire 67 and a relay wire 73 are connected by the second resistance welding operation.

Specifically, as shown in FIG. 9(c), the electricity conduction wire 67 of the lead wire 63 and the relay wire 73 are disposed in an overlapped relation such that their axial directions coincide with each other and the relay wire 73 extends rearward (rightward in FIG. 9) beyond the first weld portion 71. Subsequently, the welding electrodes 69 used for the second resistance welding operation are disposed to nip the electricity conduction wire 67 and the relay wire 73 at a position on the right end side of the first weld portion 71, and a current is caused to flow between the welding electrodes 69 so as to fuse the conductors 61 and the relay wire 73, whereby well known resistance welding is performed.

As shown in FIG. 9(d), this second resistance welding operation forms a second weld portion 75 which connects the electricity conduction wire 67 and the relay wire 73 in a region where these wires overlap each other.

The present embodiment also provides effects similar to those provided by the above-described first embodiment. In addition, the present embodiment has a merit such that, as compared with the first embodiment, the region in which the first resistance welding operation is performed can be determined with a greater degree of freedom, and such welding work is easy.

The position at which the relay wire 73 is welded to the conductors 61 is not limited to that in the present embodiment. The welding position can be freely determined so long as the welding is performed at a position which is located rearward of the first weld portion 71 and located forward of the insulation layer 65 of the lead wire 63.

[Third Embodiment]

Next, a third embodiment will be described; however, descriptions similar to those provided for the first embodiment will not be provided.

Since the temperature sensor of the present embodiment is identical with that of the first embodiment except for the first and second resistance welding operations, only the first and second resistance welding operations, which are characteristic portions of the present embodiment, will be described.

Figure 10A:
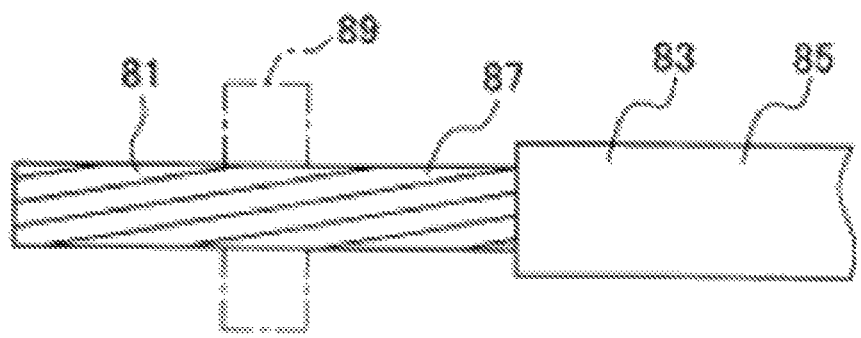
FIG. 10(a) is an explanatory view schematically showing a first resistance welding operation.
Figure 10B:
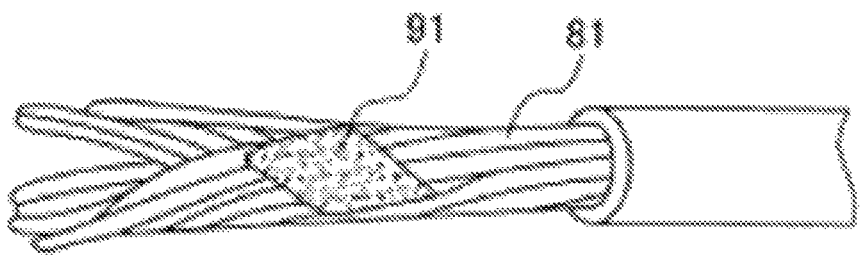
FIG. 10(b) is an explanatory view showing a first weld portion.

First, as shown in FIGS. 10(a) and 10(b), a plurality of conductors 81 are fused and joined together for unification by the first resistance welding operation.

Specifically, as shown in FIG. 10(a), a pair of welding electrodes 89 used for the first resistance welding operation are disposed to nip a portion of an electricity conduction wire 87 projecting from an insulation layer 85 of a lead wire 83 at the center (in the axial direction) of the projecting portion. Subsequently, a current is caused to flow between the welding electrodes 89 so as to fuse the conductors 81, whereby well known resistance welding is performed.

As shown in FIG. 10(b), this first resistance welding operation forms a first weld portion 91 which joins the conductors 81 together for unification.

Figure 10C:
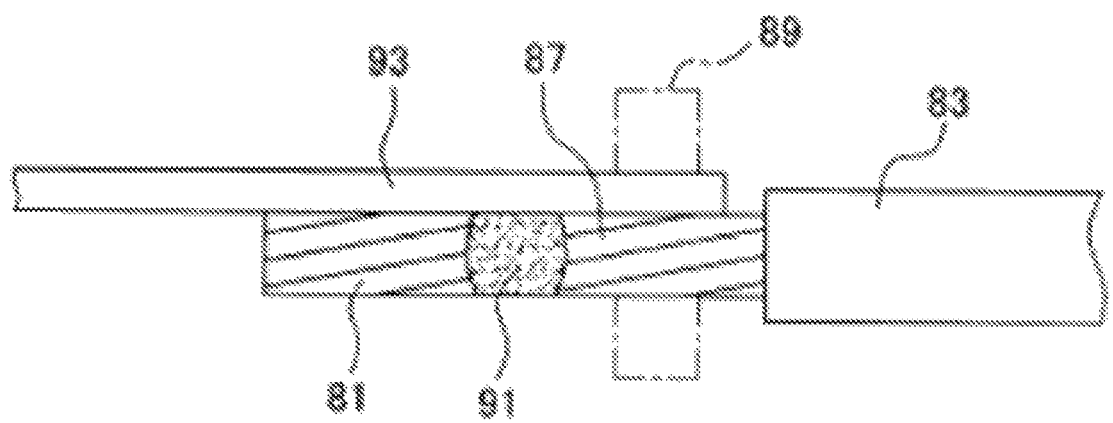
FIG. 10(c) is an explanatory view schematically showing a second resistance welding operation.
Figure 10D:
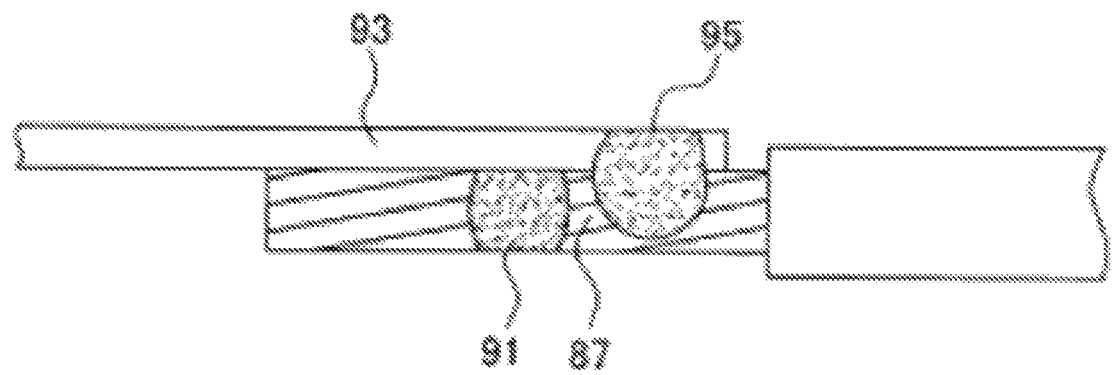
FIG. 10(d) is an explanatory view schematically showing a state after the second resistance welding operation.

Next, as shown in FIGS. 10(c) and 10(d), the electricity conduction wire 87 and a relay wire 93 are connected by the second resistance welding operation.

Specifically, as shown in FIG. 10(c), the electricity conduction wire 87 of the lead wire 83 and the relay wire 93 are disposed in an overlapped relation such that their axial directions coincide with each other and the relay wire 93 extends rearward (rightward in FIG. 10) beyond the first weld portion 91. Subsequently, the welding electrodes 89 used for the second resistance welding operation are disposed to nip the electricity conduction wire 87 and the relay wire 93 at a position on the rear end side of the first weld portion 91, and a current is caused to flow between the welding electrodes 89 so as to fuse the conductors 81 and the relay wire 93, whereby well known resistance welding is performed.

As shown in FIG. 10(d), this second resistance welding operation forms a second weld portion 95 which connects the electricity conduction wire 87 and the relay wire 93.

The present embodiment also provides effects similar to those provided by the above-described first embodiment. In addition, the present embodiment has a merit such that the work for performing the first resistance welding operation is easy, because it is not a welding work performed at the forward end of the electricity conduction wire as in the case of the first embodiment.

The position at which the relay wire 93 is welded to the conductors 81 is not limited to that in the present embodiment. The welding position can be freely determined so long as the welding is performed at a position which is located rearward of the first weld portion 91 and located forward of the insulation layer 85 of the lead wire 83.

[Fourth Embodiment]

Next, a fourth embodiment will be described; however, descriptions similar to those provided for the first embodiment will not be provided.

Since the temperature sensor of the present embodiment is identical with that of the first embodiment except for the first and second resistance welding operations, only the first and second resistance welding operations, which are characteristic portions of the present embodiment, will be described.

Figure 11A:
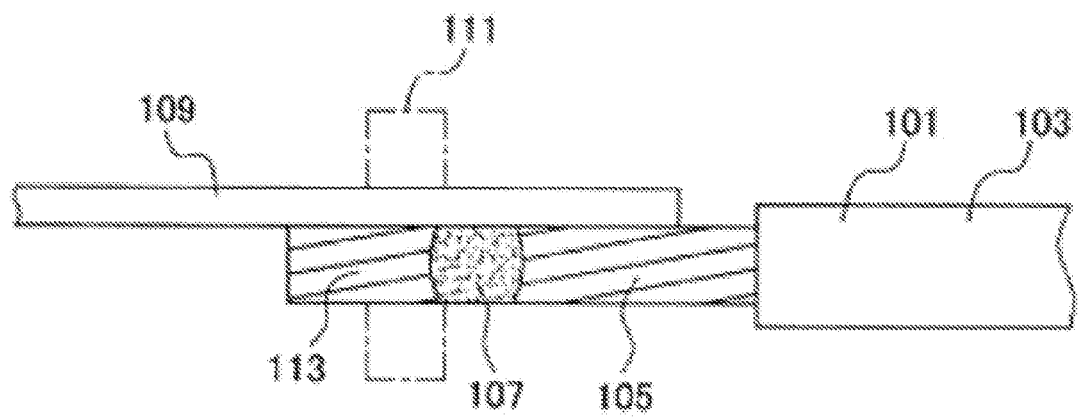
FIG. 11(a) is an explanatory view schematically showing a second resistance welding operation.

In the present embodiment, as shown in FIG. 11(a), in the same manner as in the above-described embodiments, a first weld portion 107 is formed on a portion of an electricity conduction wire 105 projecting from an insulation layer 103 of a lead wire 101 at the center (in the axial direction) of the projecting portion by the first resistance welding operation.

Subsequently, as shown in the same drawing, the electricity conduction wire 105 and a relay wire 109 are connected together by the second resistance welding operation.

Specifically, the electricity conduction wire 105 of the lead wire 101 and the relay wire 109 are disposed in an overlapped relation such that their axial directions coincide with each other and the relay wire 109 extends rearward (rightward in FIG. 11) beyond the first weld portion 107.

Subsequently, welding electrodes 111 used for the second resistance welding operation are disposed to nip the electricity conduction wire 105 and the relay wire 109 at a position where the welding electrodes 111 partially overlap with a forward end portion (left end portion) of the first weld portion 107, and a current is caused to flow between the welding electrodes 111 so as to fuse the conductors 113 and the relay wire 109, whereby well known resistance welding is performed.

Figure 11B:
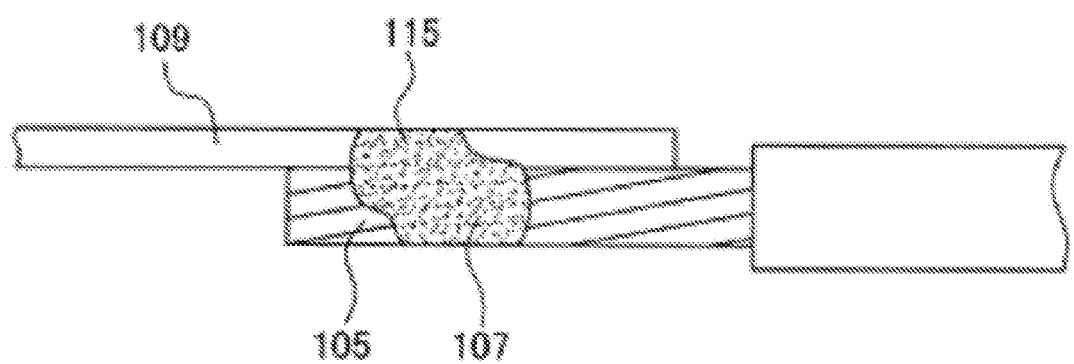
FIG. 11(b) is an explanatory view schematically showing a state after the second resistance welding operation.

As shown in FIG. 11(b), this second resistance welding operation forms a second weld portion 115 which connects the electricity conduction wire 105 and the relay wire 109 in a region where these wires overlap each other. Notably, this second weld portion 115 is united with the first weld portion 107.

The present embodiment also provides effects similar to those provided by the above-described first embodiment.

[Fifth Embodiment]

Next, a fifth embodiment will be described; however, descriptions similar to those provided for the first embodiment will not be provided.

Since the temperature sensor of the present embodiment is identical with that of the first embodiment except for the first and second resistance welding operations, only the first and second resistance welding operations, which are characteristic portions of the present embodiment, will be described.

Figure 12A:
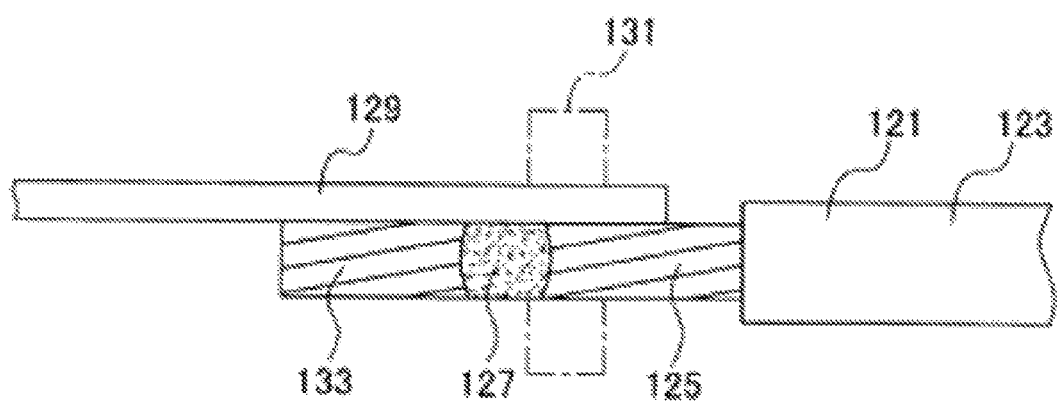
FIG. 12(a) is an explanatory view schematically showing a second resistance welding operation.

In the present embodiment, as shown in FIG. 12(a), in the same manner as in the above-described embodiments, a first weld portion 127 is formed on a portion of an electricity conduction wire 125 projecting from an insulation layer 123 of a lead wire 121 at the center (in the axial direction) of the projecting portion by the first resistance welding operation.

Subsequently, as shown in the same drawing, the electricity conduction wire 125 and a relay wire 129 are connected together by the second resistance welding operation.

Specifically, the electricity conduction wire 125 of the lead wire 121 and the relay wire 129 are disposed in an overlapped relation such that their axial directions coincide with each other and the relay wire 129 extends rearward (rightward in FIG. 12(a)) beyond the first weld portion 127.

Subsequently, welding electrodes 131 used for the second resistance welding operation are disposed to nip the electricity conduction wire 125 and the relay wire 129 at a position where the welding electrodes 131 partially overlap with a rear end portion (right end portion) of the first weld portion 127, and a current is caused to flow between the welding electrodes 131 so as to fuse the conductors 133 and the relay wire 129, whereby well known resistance welding is performed.

Figure 12B:
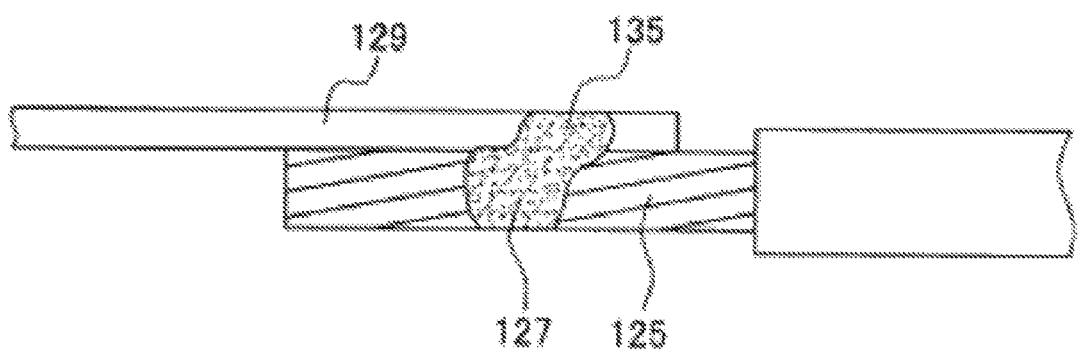
FIG. 12(b) is an explanatory view schematically showing a state after the second resistance welding operation.

As shown in FIG. 12(b), this second resistance welding operation forms a second weld portion 135 which connects the electricity conduction wire 125 and the relay wire 129 in a region where these wires overlap each other. Notably, this second weld portion 135 is united with the first weld portion 127.

The present embodiment also provides effects similar to those provided by the above-described first embodiment.

Various embodiments of the present invention have been described above; however, the present invention is not limited to the embodiments and may be practiced in various forms.

For example, the present invention is not limited to the case of welding the terminal wires of a temperature sensor to electricity conduction wires (each composed of a plurality of conductors), and may be applied to the case of welding the terminal wires of various types of sensors (e.g., oxygen sensor) to electricity conduction wires.

DESCRIPTION OF REFERENCE NUMERALS

1: temperature sensor
11: temperature sensor element
13: insulation tube
15: auxiliary ring
19, 73, 93, 109, 129: relay wire
20: terminal wire
23, 63, 83, 101, 121: lead wire
29: temperature-sensing portion
31: electrode wire
33, 61, 81, 113, 133: conductor
37, 67, 87, 105, 125: electricity conduction wire
39, 71, 91, 107, 127: first weld portion
41, 75, 95, 115, 135: second weld portion

The invention claimed is:
1. A method of manufacturing a sensor comprising:
a temperature sensor element having a temperature-sensing portion whose electrical characteristic changes with a change in an atmosphere, and a terminal wire extending from the temperature-sensing portion in an axial direction; and
an electricity conduction wire composed of a plurality of stranded conductors, extending in the axial direction, and conveying an electric signal from the temperature sensor element,
the terminal wire and the electricity conduction wire being disposed such that they overlap each other in the axial direction and being joined through welding, the method being characterized by comprising:
a first step of partially fusing the plurality of conductors by first welding, to thereby unite the plurality of conductors; and
a second step of connecting the terminal wire and the electricity conduction wire by forming a second weld portion by second welding in a region where the terminal wire overlaps with the electricity conduction wire,
wherein a first weld portion which unites the plurality of conductors is formed by the first welding, and the second weld portion is formed by the second welding at a position located rearward of the first weld portion.

2. A method of manufacturing a sensor as claimed in claim 1, wherein the first welding joins and unites the plurality of conductors at their forward ends.

3. A method of manufacturing a sensor as claimed in claim 1, wherein the first welding joins and unites the plurality of conductors at a position located rearward of forward ends of the conductors.

4. A method of manufacturing a sensor as claimed in claim 1, wherein a first weld portion which unites the plurality of conductors is formed by the first welding, and the second weld portion is formed by the second welding such that the second weld portion at least partially overlaps with the first weld portion.

5. A sensor comprising:
a temperature sensor element having a temperature-sensing portion whose electrical characteristic changes with a change in an atmosphere, and a terminal wire extending from the temperature-sensing portion in an axial direction; and
an electricity conduction wire composed of a plurality of stranded conductors, extending in the axial direction, and conveying an electric signal from the temperature sensor element,
the temperature sensor element and the electricity conduction wire being disposed such that they overlap each other in the axial direction and being joined through welding, the sensor being characterized in that
the plurality of conductors has a first weld portion where they are united by first welding; and
the terminal wire and the electricity conduction wire are connected by a second weld portion formed in a region where the terminal wire overlaps with the electricity conduction wire,
wherein the second weld portion is formed by a second welding at a position located rearward of the first weld portion.

6. A sensor as claimed in claim 5, wherein the first weld portion is formed in the region where the terminal wire overlaps with the electricity conduction wire.

7. A sensor as claimed in claim 5, wherein
the temperature sensor element has a pair of the terminal wires; and
the plurality of conductors have, at their forward ends, the first weld portion where they are united by welding.

8. A sensor as claimed in claim 5, wherein the second weld portion is formed at a position located rearward of the first weld portion through welding between the terminal wire and the electricity conduction wire.

* * * * *